Nov. 6, 1962 G. J. BAUDHUIN ET AL Re. 25,280

FLUID STEERING SYSTEM FOR VEHICLES

Original Filed Nov. 16, 1959

3 Sheets-Sheet 1

Inventors
George J. Baudhuin
Arnold C. Petersen
By McCanna, Morsbach & Pillote
Atty's

FLUID STEERING SYSTEM FOR VEHICLES

Original Filed Nov. 16, 1959 3 Sheets-Sheet 2

Inventors
George J. Baudhuin
Arnold C. Petersen

By McCanna, Morsbach & Pillote
Atty's

FLUID STEERING SYSTEM FOR VEHICLES

Original Filed Nov. 16, 1959 3 Sheets-Sheet 3

Inventors
George J. Baudhuin
Arnold C. Petersen
By McCanna, Morsbach & Pillote
Atty's.

United States Patent Office

Re. 25,280
Reissued Nov. 6, 1962

25,280

FLUID STEERING SYSTEM FOR VEHICLES

George J. Baudhuin and Arnold C. Petersen, Sturgeon Bay, Wis., assignors, by mesne assignments, to Drott Manufacturing Corporation, Milwaukee, Wis., a corporation of Wisconsin Original No. 3,028,925, dated Apr. 10, 1962, Ser. No. 853,109, Nov. 16, 1959. Application for reissue May 23, 1962, Ser. No. 197,207
11 Claims. (Cl. 180—79.2)

Matter enclosed in heavy brackets [ ] appears in the original patent but forms no part of this reissue specification; matter printed in italics indicates the additions made by reissue.

This invention relates to an hydraulic steering system for self-propelled vehicles.

In certain vehicles, such as in a gantry type mobile lift device, the spacing between the wheels must remain open and unencumbered. It is an important object of this invention to provide an improved system for turning the wheels of such a vehicle in controlled relation to each other, which system does not employ any mechanical linkages to interconnect the spaced wheels.

Another object of this invention is to provide a system for turning the wheels of a vehicle, which system will effect turning of the wheel at the inside during a turn through a relatively greater angle than the wheel at the outside, to thereby accommodate the different turning centers of the wheel.

A more particular object of this invention is to provide a steering system including a pair of steering cylinders connected to respective ones of the wheels on the vehicle to effect steering of the same, a flow reversing valve for reversibly controlling the flows of fluid to and from the several cylinders, and an arrangement for hydraulically interconnecting the cylinders with each other to equalize movement of the pistons therein.

Yet another object of this invention is to provide a steering system in accordance with the foregoing object in which the position of the operator of the flow reversing valve is always correlative with the angular position of the steering wheels to facilitate maneuvering the vehicle.

These, together with various ancillary objects and advantages of this invention will be more readily appreciated as the same becomes better understood by reference to the following detailed description when taken in connection with the accompanying drawings wherein.

Figure 1:
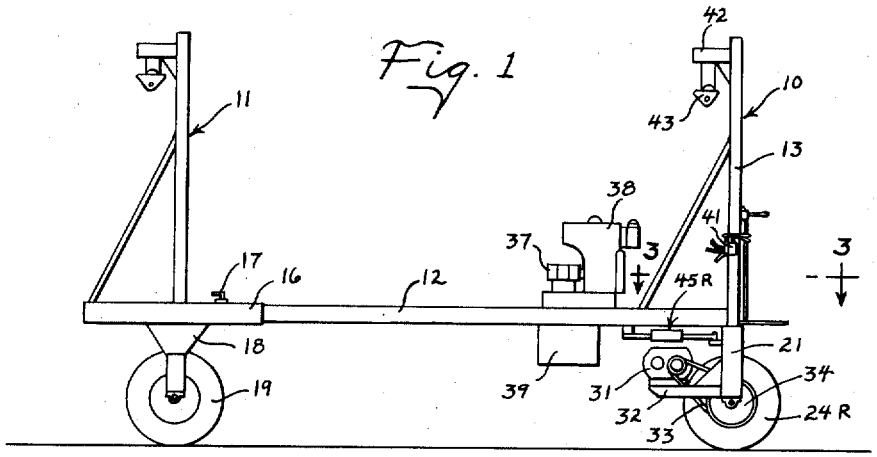
FIGURE 1 is a side elevational view of a mobile lift device embodying the invention of the present application.

The present invention relates to improvements in hydraulic steering systems in which the relative turning of the separate steering wheels is controlled hydraulically instead of mechanically. Since the steering system of the present invention does not employ any mechanical linkages to interconnect the separate steering wheels, it is particularly adapted for use in connection with vehicles, such as the gantry type mobile lift device shown in the patent to George J. Baudhuin No. 2,909,298, wherein it is necessary to maintain the space between the wheels open and unencumbered. In the present application, the hydraulic steering system is described as applied to such a gantry type mobile lift.

As more specifically described in the aforementioned patent, the mobile lift includes a pair of generally U-shaped gantry frames 10 and 11 which are interconnected at their lower ends by spaced side members 12. The frames each include upright side members 13 and a connecting bridge portion 14 which extends between the upright side members. In the specific form shown, the frame 10 is rigidly secured to the side members 12 and the frame 11 is adjustably secured thereto as by sleeves 16 which are slidable along the side members and selectively locked in adjusted position by screws 17. A set of rear wheel forks 18 are mounted on the sleeve 16 and have rear support wheels 19 journaled therein. Front wheel forks 21 are mounted for turning movement about an upright axis 22 at the lower ends of the legs 13 of the frame 10 and front wheels 24 are rotatably journaled in the front wheel forks. The steering wheels at each side of the vehicle and the apparatus for turning the same are similar and, for convenience, like numerals together with the letters L and R are utilized to designate corresponding parts on the left and right sides of the vehicle, respectively.

The steering wheels 24 are preferably also the drive wheels and, as shown, an hydraulic motor and gear reducer unit 31 is mounted as by a bracket 32 on each of the forks 21, for turning movement therewith. The motor and gear reducer unit 31 is connected through a chain 33 to a sprocket 34 on the respective one of the wheels 24 to reversibly drive the same. Fluid under pressure is reversibly supplied to the drive units 31 from a pump assembly 37 driven by an engine 38. The pump assembly 37 draws fluid from a reservoir 39 and delivers the same to a 4-way valve assembly 41 which reversibly controls the flow of fluid to the drive motors 31, all in a manner specifically described in the aforementioned patent. The valve asembly 41 also includes 4-way valves for reversibly controlling the flows of fluid to the hydraulic winch motors 42 which operate to elevate and lower the tackle blocks 43. The specific vehicle drive system forms no part of the present invention and further detailed description thereof is deemed unnecessary.

Figure 3:
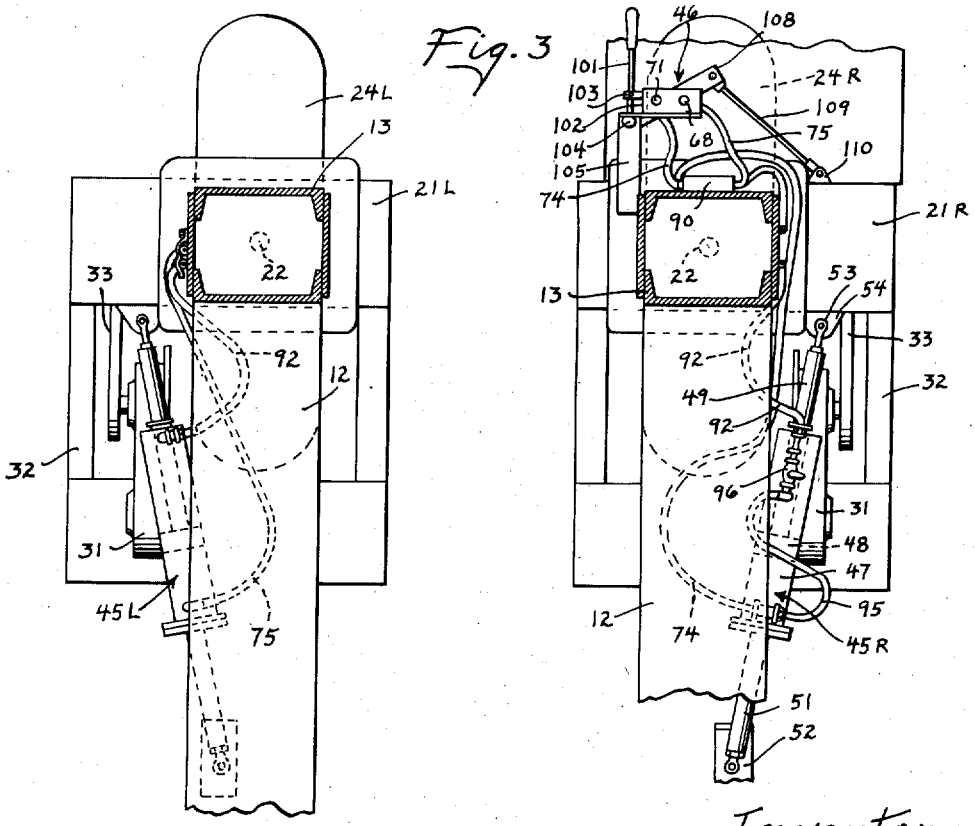
FIG. 3 is a fragmentary horizontal sectional view taken on the plane 3—3 of FIG. 1 and showing the front steering wheels in the straight ahead position.
Figure 4:
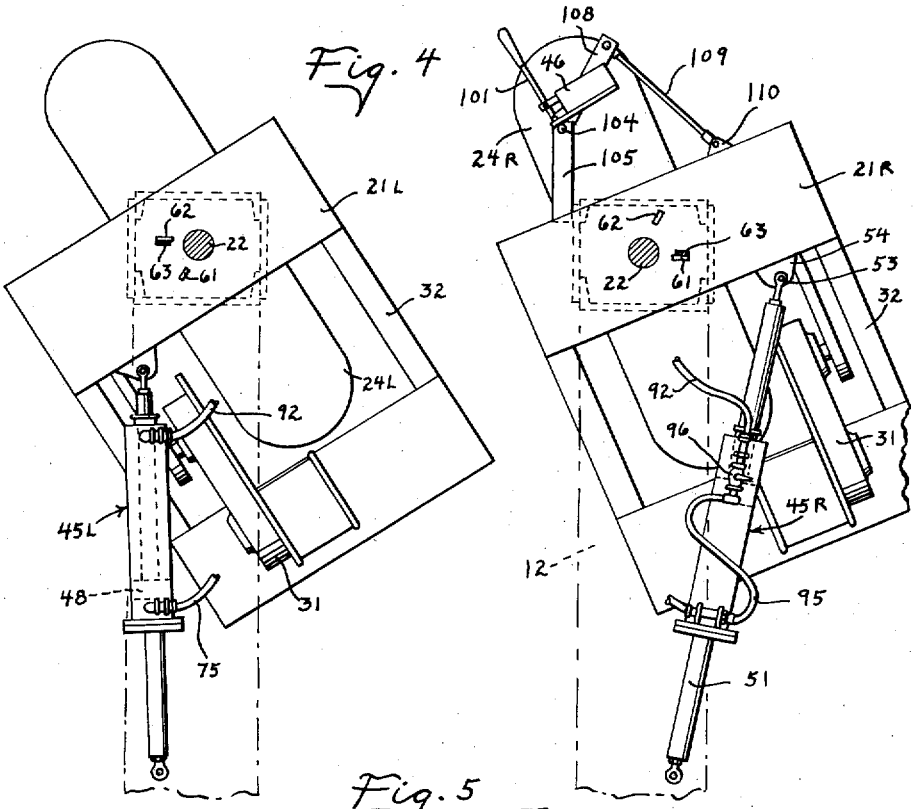
FIG. 4 is a fragmentary horizontal sectional view through the front gantry frame and showing the vehicle wheels turned to one limiting position thereof.

The hydraulic steering system of the present invention includes a steering unit 45 for each of the steered wheels 24 and a 4-way flow reversing valve 46 for reversibly controlling the flows of fluid to a pair of the steering units. In the form illustrated, only the front wheels of the vehicle turn, and a single pair of steering units are provided. These steering units each include a cylinder 47 and a piston 48 which is slidable in the cylinder and has a rod 49 extending out of one end thereof. The steering units are connected to the respective steering forks and to the side members 12 of the vehicle, and, in the specific form shown, the cylinders 47 are pivotally mounted by an arm 51 and bracket 52 for horizontal swinging movement on the side members 12 of the vehicle frame. The rods 49 of the steering units are pivotally connected by a pin 53 to an ear 54 on the respective steering wheel bracket or fork 21. The steering units are arranged so as to turn the fork at the inside during a turn through a relatively greater angle than the fork at the outside of the turn, to accommodate the different turning radii of the wheels due to the lateral spacing therebetween. This is achieved in the present device by locating the pivot pins 53, which connect the steering units to the forks, at the outboard side of the turning axes of the respective steering forks and at a point such that the line through the pivot pin 53 and the turning axis 22 defines an angle of greater than ninety degrees, when the wheels are positioned for straight ahead movement as shown in FIG. 3. With this arrangement, the forks 21 will be turned through a greater angle when the piston is retracted than when the piston is extended a corresponding distance. As shown in FIG. 4, the left fork 21L is turned through an angle of approximately thirty-two degrees when the piston of the left steering unit 45L is retracted a preselected amount, and the right steering fork 21R is turned in the same general direction, and through a lesser angle of approximately twenty-five degrees, when the piston of the right steering unit 45R is extended a corresponding distance. Angularly spaced stops 61 and 62 are provided on each of the forks 21, and cooperate with a stationary stop member 63 mounted on the lower ends of the forward frame 10, to limit the angular movement of the forks. The angular position of the stops 61 and 62 is correlated with the differential turning rate of the steering wheels, the stops 62 being arranged to limit movement of the forks as the respective pistons are retracted and the stops 61 being arranged to limit angular movement of the forks when the respecitve pistons are extended. Necessarily, the differential rate at which the forks are turned will vary dependent on the width of the vehicle and the difference in the turning radii of the wheels.

Figure 5:
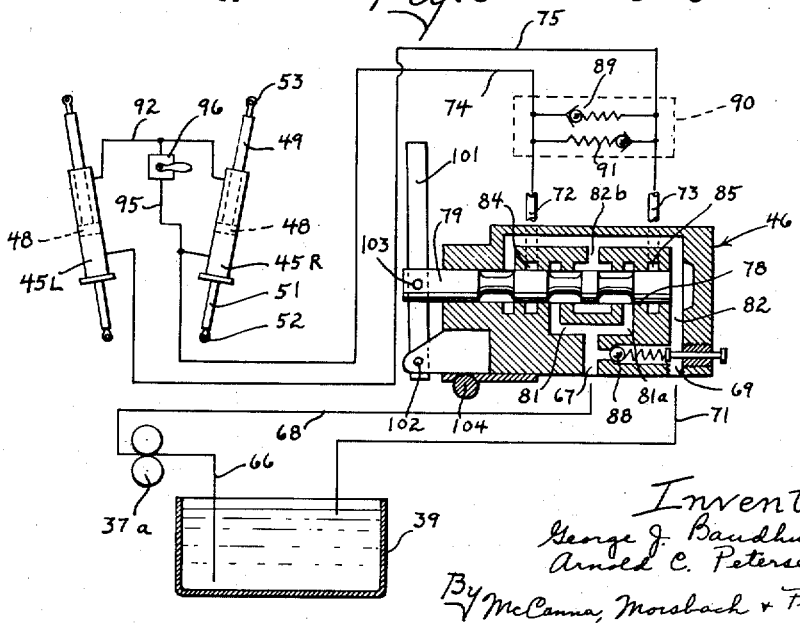
FIG. 5 is a schematic diagram illustrating the hydraulic steering system.

Fluid under pressure is supplied to the steering units 45 by means of a pump 37a and the flow reversing valve 46. The pump 37a is one of the pumps in the assembly 37 which is driven by the engine 38 and has its inlet 66 connected to the reservoir 39. The flow reversing valve has a fluid inlet 67 connected to the outlet of the pump through a conduit 68, and a return outlet 69 which is connected to the reservoir through a conduit 71. The flow reversing valve also has a pair of controlled outlet ports 72 and 73 which are connected through conduits 74 and 75 to the left and right steering cylinders 45L and 45R respectively. The valve has a valve bore 78 therein and a spool valve member 79 which is slidable in the bore. The pressure inlet port 67 communicates through lateral passages 81 and 81a with the valve bore intermediate the ends thereof, and the return passage 71 communicates through passage 82 with the bore adjacent opposite ends. The controlled outlet or work ports 72 and 73 communicate through ports 84 and 85 with the valve bore. When the valve is in its neutral position shown in FIG. 5, the spool member 79 blocks the work ports 84 and 85 and communicates the pressure inlet port 81 through a return port 82b with return passage 82 to thereby by-pass the pump discharge back to the reservoir. When the spool member 79 is moved in one direction from its neutral position, such as to the left as viewed in FIG. 5, fluid under pressure will be supplied from the inlet passage 81 to the work port 84 for flow through the conduit 74 to the right hand steering cylinder 45R and, simultaneously, the left hand steering cylinder will be communicated through conduit 75, work port 85, and return passage 82 to the return line 71. The pistons in the left and right steering cylinders will therefore be moved in relatively opposite directions to extend the right hand cylinder and retract the left hand cylinder and thereby turn the wheels to the left. Conversely, when the spool 79 is moved to the right as viewed in FIG. 5, fluid pressure will be supplied to the cylinders in a direction to turn the wheel to the right. A pressure relief valve 88 is preferably provided between the inlet and return passages 67 and 82 to prevent overloading of the pump, and cross relief valves 89 and 91 located in a casing 90 are provided between the work conduits 74 and 75 to prevent overloading of the system or stressing of the parts in the event one wheel strikes an obstruction which prevents it from turning.

In order to prevent turning of the steering wheels at relatively different rates, provision is made for hydraulically interconnecting the cylinders 45L and 45R. For this purpose, a connecting conduit 92 is provided and communicates with the respective cylinders at the side of the piston 48 therein opposite the side with which the conduits 74 and 75 communicate. This forms a closed hydraulic circuit between the cylinders at one side of the piston therein so that fluid displaced from one cylinder as one piston is extended, is passed to the other cylinder and moves the piston therein to its retracted position to thereby effect equal but opposite movement of the pistons in the left and right steering cylinders.

Since the relative movement of the cylinders is controlled by the closed hydraulic circuit including the connecting conduit 92, it is apparent that any leakage from the closed circuit will preclude the vehicle wheels from tracking properly. Such leakage may occur around the pistons 48 in the cylinder and, in order to compensate for such leakage, a by-pass conduit 95 is provided and is connected between the connecting conduit 92 and one of the work conduits such as 74. A manually operable by-pass valve 96 is provided in the by-pass conduit and is adapted, when opened, to pass fluid from the work conduit 74 to the connecting conduit 92. In order to readjust the cylinders so as to effect proper turning of the respective forks, the control valve is operated to a position to supply pressure to the conduit 74 until the steering fork 21R reaches its limiting position in which the stop 61 abuts against the stop member 63. If fluid has leaked from the closed circuit including the connecting conduit 92, the left hand fork will not yet have reached its limiting position in which the stop 62 engages the stop member 63. The by-pass valve 96 is then opened and continues to supply fluid to the connecting conduit 92, which fluid operates on the piston 48 in the left steering cylinder and moves the left fork until the stop 62 engages the stop member 63. At that time the by-pass valve 96 is shut off.

Movement of the valve spool 79 is effected by means of a manually operable lever 101 which is pivotally mounted by a pin 102 on the valve body and pivotally connected intermediate its ends by a pin 103 to the valve spool. Steering of the vehicle is thus effected by manipulation of the lever 101. In order to facilitate maneuvering of the vehicle, the valve is mounted and arranged so that the operating lever position will, at all times, be correlative with the angular position of the wheels. For this purpose, the valve body is mounted as a rod 104 and bracket 105 for turning movement about an axis parallel to the turning axes 22 of the steering forks. The operating lever 101 is mounted by the pin 102 for horizontal swinging movement relative to the valve body about an axis which is parallel and preferably closely adjacent to the axis of the rod 104. The rod 104 is connected through an arm 108 and link 109 to an ear 110 on the right steering fork 21R so that the valve body will turn in response to turning of the right fork. As shown in FIG. 3, the operating lever 101 is arranged to extend forward, when the vehicle wheels 24 are positioned for straight ahead movement, and the valve and its operating lever will move to the left or to the right as the vehicle wheels are respectively turned to the left and to the right.

Figure 2:
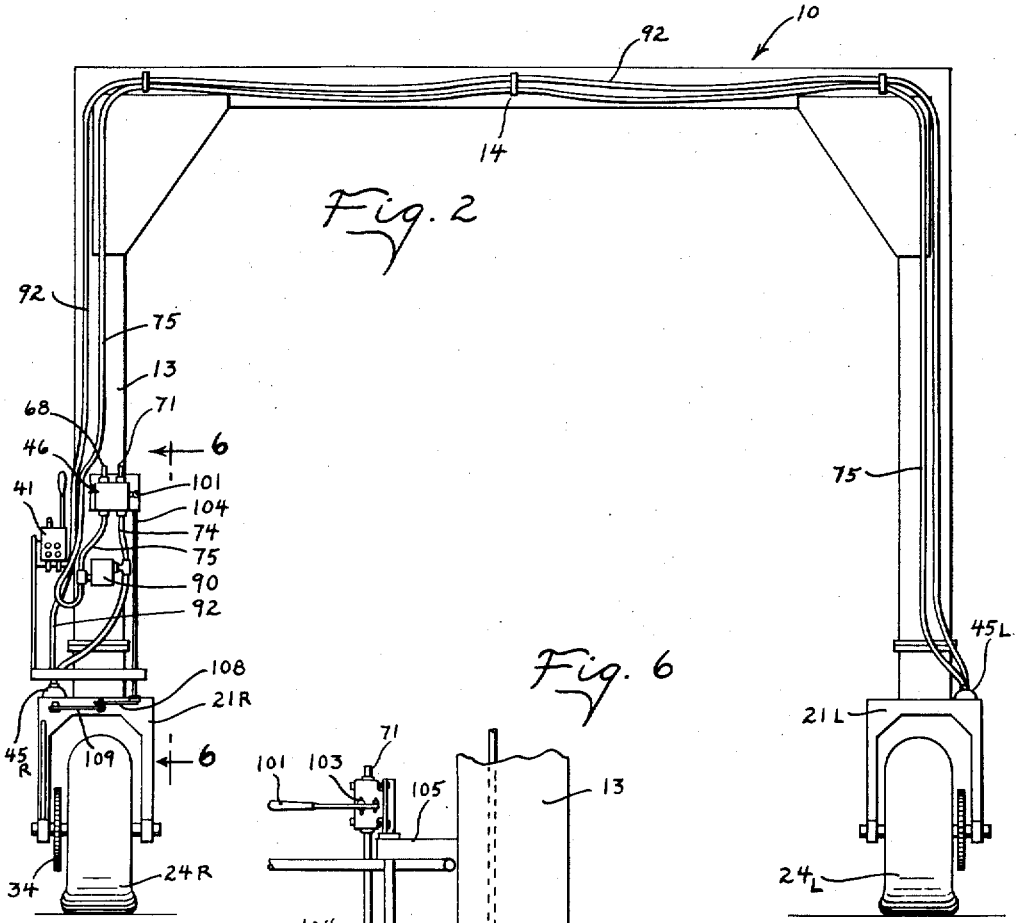
FIG. 2 is a front elevational view of the mobile lift device.
Figure 6:
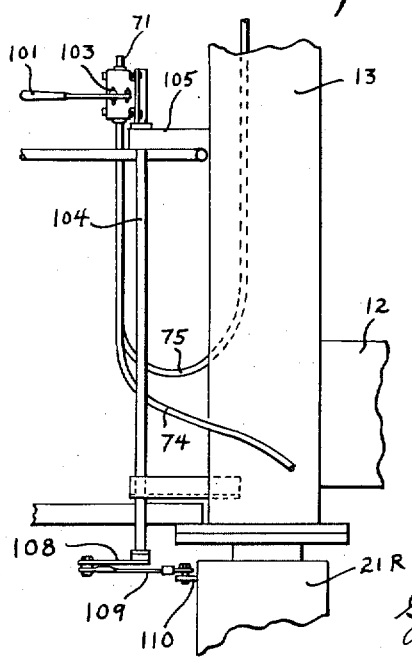
FIG. 6 is a fragmentary vertical sectional view taken on the plane 6—6 and illustrating the manner of mounting the control valve for turning movement with the steering wheel forks.

From the foregoing it is thought that the operation of the device will be readily understood. Since the relative movement of the wheels is controlled entirely hydraulically, no mechanical linkage between the wheels is required. The steering system is therefore particularly adapted for use on those vehicles such as the gantry type mobile lift device shown wherein it is necessary to maintain the space between the wheels open and unencumbered. The conduit 74 leading to the left cylinder and the connecting conduit 92 can be easily mounted at any convenient location and as best shown in FIG. 2, are arranged to extend upwardly along the legs of the U-shaped frames and across the bridge portion 14 thereof. Further, although the position of the wheels is controlled hydraulically, the valve operating lever is nevertheless so arranged as to indicate, at all times, the angular position of the wheels to facilitate maneuvering of the vehicle.

We claim:

1. In combination with a vehicle having spaced steering wheel brackets mounted for turning movement about an upright axis and a wheel rotatably mounted on each bracket, an hydraulic steering system providing the sole means for controlling relative turning movement of said wheel brackets, said hydraulic steering system comprising a pair of pressure cylinders each having a piston slidable therein, means connecting the pressure cylinders to respective ones of the wheel brackets at points laterally offset from relatively opposite sides of the respective turning axis of the brackets to effect turning of both brackets in the same direction in response to extension of one piston and retraction of the other, a fluid pump, a flow reversing valve connected to the pump and having first and second controlled outlet ports each connected to a respective one of the cylinders at one side of the pistons therein to effect movement of the pistons in relatively opposite directions, means mounting said valve for turning movement about an axis parallel to the turning axis of said wheel brackets, means operatively connecting said valve to one of said wheel brackets to effect turning of said valve in a direction and amplitude correlative with the turning of the wheel bracket, said valve having an operating lever movable relative to the valve about an axis parallel to the turning axis of the valve whereby the angular position of the lever is correlative with the angular position of the wheel brackets, and a fluid conduit connected to said cylinders at the other sides of the pistons therein to intercommunicate the cylinders with each other and pass fluid from one cylinder to the other as the pistons in the cylinders move in opposite directions to equalize the movement of the pistons in opposite directions.

2. The combination of claim 1 wherein said connecting means includes a linkage.

3. In combination with a gantry-type mobile lift having spaced legs and a connecting bridge portion, a steering wheel bracket mounted on each leg for turning movement about an upright axis, a wheel rotatably mounted on each bracket, an hydraulic steering system providing the sole means for controlling relative turning movement of said wheel brackets, said hydraulic system comprising a pair of pressure cylinders each having a piston slidable therein, means connecting the pressure cylinders to the wheel brackets to effect turning of the latter in response to extension and retraction of the cylinders, a fluid pump, a flow reversing valve located adjacent one leg of the mobile lift and connected to said pump and having first and second controlled outlet ports, a first conduit extending from said first controlled outlet port to the steering cylinder on said one leg of the mobile lift, a second conduit extending from said second controlled outlet port and along said bridge portion to the steering cylinder on the other leg of the mobile lift, said first and second conduits each communicating with the respective cylinders at one side of the piston therein, a connecting conduit communicating with each of said cylinders at the other sides of the pistons therein and extending alongside the legs and connecting bridge portion of the lift to effect turning of the wheels in controlled relation to each other, said valve including a valve body mounted for turning movement about an axis parallel to the turning axis of said wheel brackets, a valve operating lever mounted for movement relative to the valve about an axis parallel to the turning axis of the valve, and means connecting said valve body to the adjacent steering wheel bracket for turning the valve body in a direction and amplitude correlative with the direction and amplitude of turning movement of the wheel bracket.

4. In combination with a gantry-type vehicle having an upright U-shaped frame, spaced wheel forks mounted on the frame for turning movement about an upright axis and a wheel journaled on each fork, an hydraulic steering system providing the sole means for controlling relative turning movement of said wheel forks, said hydraulic system comprising a pair of steering units each including a cylinder and piston slidable in the cylinder, means pivotally attaching opposite ends of the steering units to the frame and to the steering forks, the pivotal connection of the units to the forks being laterally offset from the turning axis of the forks and located at the outboard side of the vehicle at a point to effect turning of the wheel bracket at the inside during a turn through a relatively greater angle than the wheel at the outside during a turn in response to extension of one operator and retraction of the other operator substantially equal distances from a neutral position, a reservoir, a pump for pumping fluid from the reservoir, a flow reversing valve having first and second controlled outlets, first and second conduits connected to said first and second outlets and to a respective one of said cylinders at one side of the piston therein, to effect simultaneous movement of the pistons in relatively opposite directions, a connecting conduit communicating with said cylinders at the other sides of the pistons therein for passing fluid from one cylinder to the other and thereby equalize the movement of the pistons in opposite directions, means mounting said valve for turning movement about an axis parallel to the turning axis of one wheel fork, said valve having an operator movable relative thereto about an axis parallel to the turning axis of the valve, and means connecting the valve to one wheel fork to turn the valve in a direction and amplitude correlative with the direction and amplitude of turning of the forks whereby the operating lever for the valve is correlative with the position of the wheel forks.

5. In combination with a vehicle having a frame, first and second spaced steering wheel brackets mounted on the frame for turning movement about an upright axis, and a wheel rotatably mounted on each bracket; an hydraulic steering system providing the sole means for controlling relative turning movement of said wheel brackets, said steering system comprising first and second steering units each including a cylinder and a piston slidable in said cylinder, means pivotally attaching opposite ends of the first and second steering units to the frame and to the first and second steering forks respectively at points laterally offset from relatively opposite sides of the respective turning axis to effect turning of both brackets in the same direction in response to extension of one piston and retraction of the other piston, said first and second steering units being arranged relative to the respective steering forks to effect turning of the wheel at the inside during a turn through a relatively greater angle than the wheel at the outside during a turn in response to extension of one piston and retraction of the other piston substantially equal distances from a neutral position in which the wheel forks are positioned for straight ahead movement, a reservoir, a pump for pumping fluid from the reservoir, a flow reversing valve having first and second controlled outlet ports each connected to a respective one of the cylinders at one side of the piston therein to effect movement of the pistons in relatively opposite directions, a fluid conduit connected to said cylinders of said first and second units at the other sides of the pistons therein to communicate said cylinders with each other and pass fluid from one cylinder to the other as the pistons in the first and second steering units move in opposite directions, first and second stop means engageable with said first and second wheel brackets to limit turning in at least one direction, the positions of said first and second stop means being correlated with the differential turning movement produced by said steering units to limit maximum turning of the wheel bracket at the inside during a turn to a relatively greater angle from straight ahead position than the wheel bracket at the outside during the turn, a by-pass conduit having one end connected to said fluid conduit and the other end connected to receive fluid under pressure from said pump, and a by-pass valve in said by-pass conduit adapted to be opened when one wheel bracket is against its stop means to supply fluid under pressure to said fluid conduit and replenish any loss of fluid from said cylinders at said other side of the pistons therein whereby to move the other wheel bracket against its stop means to re-align the wheels.

6. In combination with a gantry-type mobile lift including a frame having spaced legs and a connecting bridge portion, first and second steering wheel brackets mounted on the legs of for turning movement about an upright axis and a wheel rotatably mounted on each bracket; an hydraulic steering system providing the sole means for controlling relative turning movement of said wheel brackets, said hydraulic system comprising first and second steering units each including a cylinder and a piston slidable in said cylinder, means pivotally attaching opposite ends of the first and second steering units to the frame and to the first and second steering forks respectively at points laterally offset from relatively opposite sides of the respective turning axis to effect turning of both brackets in the same direction in response to extension of one piston and retraction of the other, said first and second steering units being arranged relative to the respective steering forks to effect turning of the wheel at the inside during a turn through a relatively greater angle than the wheel at the outside during the turn in response to extension of the piston in one unit and retraction of the piston in the other unit substantially equal distances from a neutral position, in which the wheel forks are positioned for straight ahead movement, a reservoir, a pump for pumping fluid from the reservoir, a flow reversing valve located adjacent one leg of said mobile lift and connected to the pump and having first and second controlled outlet ports, a first conduit extending from said first controlled outlet port to the cylinder of said first steering unit on said one leg of the mobile lift, a second conduit extending from said second controlled outlet port and along said bridge portion to the cylinder of said second steering unit on the other leg of the mobile lift, said first and second conduits communicating with the cylinders of said first and second steering units at one side of the pistons therein, a connecting conduit communicating with each of said cylinders at the other sides of the pistons therein and extending alongside the legs and connecting bridge portion of the lift to effect turning of the wheels in controlled relation to each other, first and second stop means engageable with said first and second wheel brackets to limit turning in at least one direction, the positions of said first and second stop means being correlated with the differential turning movement produced by said steering units to limit maximum turning of the wheel at the inside during a turn to a relatively greater angle from straight ahead position than the wheel bracket at the outside during the turn, a by-pass conduit having one end connected to said connecting conduit and the other end connected to receive fluid under pressure from the pump, and a by-pass valve in said by-pass conduit adapted to be opened when one wheel bracket engages its stop means to supply fluid under pressure to said cylinders at said other side of the pistons therein whereby to move the other wheel bracket against the repective stop means to re-align the wheels.

*7. A steering system comprising, a horizontally disposed frame, a wheel fork pivotally mounted to said frame about a first generally vertical axis, a hydraulic motor connected to said frame and to said fork, a fluid pressure source, a valve between said source and said hydraulic motor for controlling the supply of fluid to said motor for actuating the same to cause said fork to pivot with respect to said frame, means mounting said valve for turning movement about a second axis parallel to said first axis, a steering lever movable relative to said valve about an axis parallel to said second axis and connected to said valve for controlling the expansion and contraction of said motor in response to movements of said lever, and a linkage connecting said valve to said fork to effect a movement of said valve about said second axis in a direction and amount corresponding to the movement of said fork.*

*8. A steering system comprising, a horizontally disposed frame, a wheel fork pivotally mounted to said frame about a first generally vertical axis normal to said frame, a horizontally disposed steering lever pivotally mounted about a second axis parallel to said first axis, means causing said wheel fork to turn in an amount and direction corresponding to an amount and direction of movement of said lever, said means comprising, a fluid pressure source, a hydraulic motor between said frame and said fork, a valve between said source and said motor, said valve comprised of a valve housing movable angularly with said wheel fork, and a movable member connected to and movable with said lever, said movable member having a first position causing said motor to turn the fork in one direction, a second position causing said motor to turn the fork in the other direction, and a third neutral position between said first and second positions, whereby when said steering lever is pivoted in a first direction, said movable member moves from said neutral position to said first position, causing said wheel fork to pivot in said first direction and said housing to move with respect to said movable member, and thereby returning said movable member to said neutral position.*

*9. A hydraulic steering system for turning a pair of laterally spaced vehicle wheels in controlled relation to each other and for causing said wheels to follow the angular movements of a horizontally disposed steering lever, comprising, a frame, a pair of wheel supporting forks pivotally mounted to said frame, a pair of pressure steering cylinders each having a piston slidable therein, means connecting each cylinder to one of said wheel forks for turning the latter in response to extension and retraction of the piston, a source of pressurized fluid, a fluid control valve between said cylinders and said source, said valve comprised of a valve housing connected to and movable with one of said wheel forks and a movable member connected to and movable with said control lever, said movable member having a first position causing one of said cylinders to extend and the other to contract, a second position causing said one cylinder to contract and said other cylinder to extend, and a third neutral position between said first and second positions, whereby when said lever is pivoted in one direction, said movable member moves from said neutral position to said first position and causes said wheel forks to pivot in said one direction and said housing to move with respect to said movable member, and thereby returning said movable member to said neutral position.*

*10. A hydraulic steering system for turning a pair of laterally spaced vehicle wheels in controlled relation to each other and for causing said wheels to follow the angular movements of a horizontally disposed steering lever, comprising, a frame, a pair of wheel supporting forks pivotally mounted to said frame, a pair of pressure steering cylinders each having a piston slidable therein, means connecting each cylinder to one of said wheel forks for turning the latter in response to extension and retraction of the piston, a source of pressurized fluid, a fluid control valve between said cylinders and said source, said valve comprised of a valve housing connected to and movable with one of said wheel forks and a movable member connected to and movable with said control lever, said valve housing having two ports connected respectively to one end of said cylinders, said movable member being movable to different positions to connect said ports alternately and selectively to said source or to a fluid return,*

*a conduit interconnecting the other ends of said cylinders, stops to limit turning of said forks in either direction, and means including a valve to supply fluid under pressure to said conduit.*

*11. A steering system comprising, a horizontally disposed frame, a wheel bracket pivotally mounted to said frame about a first axis, a hydraulic jack having a first end mounted to said frame and a second end mounted to said bracket, a fluid pressure source, a valve between said source and said jack for controlling the fluid to said jack for expanding and contracting said jack causing said bracket to pivot with respect to said frame, means mounting said valve for turning movement about a second axis parallel to said first axis, stop means on said frame engageable with said wheel bracket for limiting turning movement in at least one direction, a linkage connecting said valve to said fork to effect a turning of said valve in a direction and amount corresponding to the movement of said fork, and said valve having an operating*

*lever movable relative to said valve about an axis parallel to the turning axis of said valve, whereby the angular position of the lever is correlative with the angular position of said fork.*

References Cited in the file of this patent or the original patent

UNITED STATES PATENTS

| | | |
|---|---|---|
| 2,368,135 | Hamill | Jan. 30, 1945 |
| 2,506,093 | MacDuff | May 2, 1950 |
| 2,512,979 | Strother | June 27, 1950 |
| 2,555,649 | Krotz | June 5, 1951 |
| 2,557,936 | Brown | June 26, 1951 |
| 2,865,034 | Petite | Dec. 23, 1958 |
| 2,909,298 | Baudhuin | Oct. 20, 1959 |

FOREIGN PATENTS

| | | |
|---|---|---|
| 733,901 | Great Britain | July 20, 1955 |